United States Patent [19]

Ott

[11] 3,876,640

[45] Apr. 8, 1975

[54] 2-CYANO-MORPH OLINO-SUBSTITUTED ANILINES

[75] Inventor: Hans Ott, Basle, Switzerland

[73] Assignee: Sandoz, Inc., Hanover, N.J.

[22] Filed: Apr. 8, 1974

[21] Appl. No.: 458,545

Related U.S. Application Data

[62] Division of Ser. No. 177,154, Sept. 1, 1971, Pat. No. 3,819,625, which is a division of Ser. No. 849,863, Aug. 13, 1969, Pat. No. 3,642,791.

[52] U.S. Cl. .......... 260/247.5 R

[51] Int. Cl. .......... C07d 87/40

[58] Field of Search .......... 260/247.5 R

[56] References Cited

UNITED STATES PATENTS

| | | | |
|---|---|---|---|
| 2,642,436 | 6/1953 | Clinton et al. | 260/247.5 R |
| 2,642,437 | 6/1953 | Clinton et al. | 260/247.5 R |
| 3,723,432 | 5/1973 | Ott | 260/251 QB |

FOREIGN PATENTS OR APPLICATIONS

| | | | |
|---|---|---|---|
| 714,568 | 11/1968 | Belgium | 260/251 QB |

*Primary Examiner*—Lorraine A. Weinberger
*Assistant Examiner*—Richard D. Kelly
*Attorney, Agent, or Firm*—Gerald D. Sharkin; Richard E. Vila

[57] ABSTRACT

Disclosed are compounds of the class of morpholino-substituted 1-substituted-4-aryl-2(1H)-quinazolinones useful as pharmaceutical agents, e.g., as anti-inflammatory agents.

2 Claims, No Drawings

2-CYANO-MORPHOLINO-SUBSTITUTED ANILINES

This is a division of co-pending Ser. No. 177,154, filed Sept. 1, 1971, now U.S. Pat. No. 3,819,625, which is a division of Ser. No. 849,863, filed Aug. 13, 1969, now U.S. Pat. No. 3,642,791.

This invention relates to bicyclic compounds. In particular, the invention relates to 1-substituted-4-aryl-2(1H)-quinazolinones having a morpholino substituent in the benzene portion of the quinazoline ring, and to methods of preparing the same. The invention also relates to pharmaceutical compositions and methods employing said substituted quinazolinones.

The quinazolinones of the invention may be represented by the formula I:

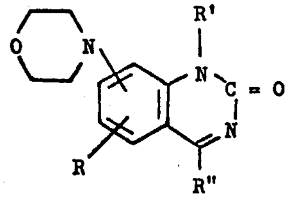
I where

R represents hydrogen; halo, preferably of atomic weight no greater than 80; lower alkyl, preferably containing 1 to 3 carbon atoms; or lower alkoxy, preferably containing 1 to 2 carbon atoms;

R′ represents lower alkyl, preferably containing from 1 to 5 carbon atoms, e.g., methyl, ethyl, propyl, isopropyl, butyl, sec-butyl and isobutyl; allyl, methallyl, or propargyl;

R″ represents phenyl, or substituted phenyl of the formula:

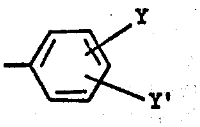

wherein

Y represents halo of atomic weight no greater than 80; lower alkyl, preferably containing from 1 to 3 carbon atoms, e.g., methyl; lower alkoxy, preferably containing from 1 to 2 carbon atoms, e.g., methoxy; or trifluoromethyl; and Y′ represents hydrogen; halo of atomic weight no greater than 80; lower alkyl, preferably containing from 1 to 3 carbon atoms, e.g., methyl; or lower alkoxy, preferably containing from 1 to 2 carbon atoms, e.g., methoxy, or a non-toxic pharmaceutically acceptable acid addition salt thereof.

A first preferred process for preparation of the compounds I and referred to herein as Procedure A, involves the reaction of an appropriately substituted amino-4-aryl-2-(1H)-quinazolinone of the formula II with a compound of formula IIA, as illustrated as follows:

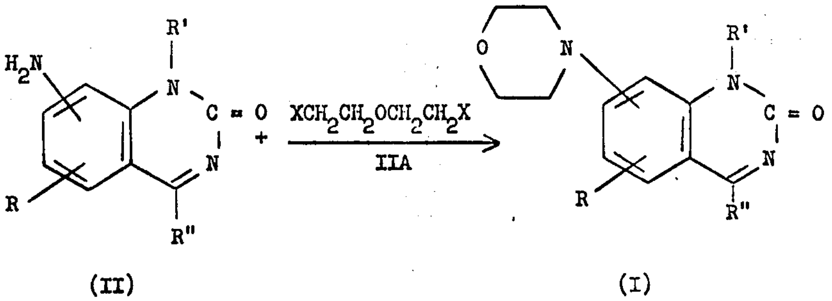

(II) (I)

wherein R, R′ and R″ are as above defined, and X is chloro or bromo, and thus more particularly involves subjecting said compound II to reaction with a bis(2-haloethyl)ether in the presence of an acid acceptor of known type which is otherwise non-reactive with compound II, e.g., an alkalimetal carbonate or tertiary amine, to form the compounds of the invention of formula I. This reaction is carried out at elevated temperatures of from 100°C. to 200°C., preferably at 100°C. to 170°C. and preferably using the bis(2-bromoethyl)ether in excess as a solvent. Other inert solvents may be also employed. The reaction product of formula I may be isolated from the reaction mixture of Procedure A by working up by established procedures.

The second preferred process, referred to herein as Procedure B, involves the cyclization-reaction between an appropriately substituted morpholino-o-aminobenzophenonimine of formula III and phosgene and may be illustrated as follows:

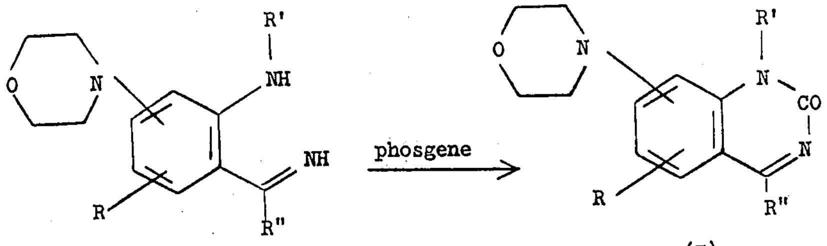

(III) (I)

wherein R, R′ and R″ are as above defined. The production of compounds of formula I by Procedure B involving the reaction of compound III with phosgene may be carried out at temperatures in the range of 0°C. to 50°C., preferably 10°C. to 30°C. The reaction is desirably carried out in an inert organic solvent which may be any of several convenient for the purpose, preferably an aromatic hydrocarbon, e.g., benzene, toluene, and xylene, more preferably benzene. The mole ratio of phosgene to compound III is not particularly important and a substantial excess of phosgene is employed in the preferred forms of practice to obtain more efficient reaction rates. In a preferred embodiment of the invention, the cyclization reaction is carried out in the presence of an acid acceptor of known type which may be either an inorganic base or organic base, e.g., triethylamine. The compounds of formula I may be isolated from the reaction mixture of Procedure B by working up by conventional techniques.

The compounds of formula II employed as starting material in Procedure A may be prepared as described in copending application Ser. No. 775,201 filed Nov. 12, 1969, and preferably by reduction in a known manner of the corresponding nitro substituted 4-aryl-2-(1H)-quinazolinone as described in said application. The said nitro substituted 2-(1H)-quinazolinones are also prepared as described in said application by one or more procedures including, for example, the cyclization of a nitro substituted 2-alkylaminobenzophenone with urethane in the presence of zinc chloride at temperatures of 160°C. to 200°C.; the nitration of an appropriately substituted 1-substituted-4-aryl-2(1H)-quinazolinone; and the cyclization of a nitro substituted 2-alkylaminobenzophenonimine with phosgene.

The compounds of formula III employed as starting material in Procedure B are novel compounds and are preferably prepared by a Step 1 reaction involving reacting a compound of the formula IV:

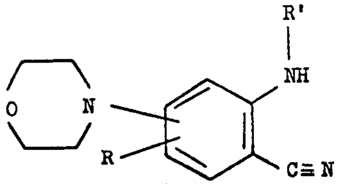

IV in which R and R' are as defined, with a compound of the formula V:

$$Q—R''$$

V in which R'' is as defined and Q is lithium or —MgX° wherein X° is iodo chloro or bromo, in an inert organic solvent.

The preparation of compounds III by Step 1 involving reaction of a compound IV and compound V may be carried out at temperatures in the range 0°C. to 40°C., preferably 5°C. to 25°C. and in an inert medium which may be provided by any of several organic solvents of known type for such reactions, preferably an ether such as diethyl ether, tetrahydrofuran and dioxane. The preferred compound V is a phenyl lithium compound.

The compounds of formula IV employed as starting material in preparation of compounds III are novel compounds but may be prepared employing procedures and sequences known in the art for preparation of 2-alkylaminobenzonitriles as modified or supplemented by the disclosure herein. A multi-step procedure for purposes of illustration involves the reaction in a Step 2 of a compound of the formula VI:

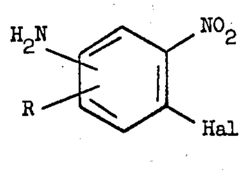

VI with the bis(2-haloethyl)ether to obtain a compound of the formula VII:

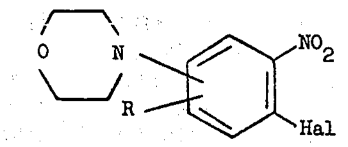

VII wherein R is as defined and Hal indicates chloro or bromo, said compound VII then being reacted in a Step 3 with cuprous cyanide to obtain a compound of formula VIII:

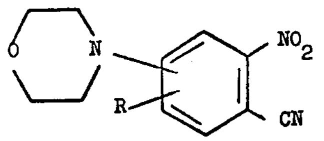

VIII wherein R is as defined, said compound VIII then being subjected in a Step 4 to reduction in a known manner to obtain a compound IX:

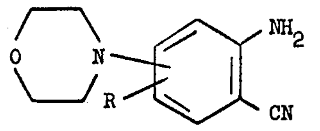

IX in which R is as defined, said compound IX then being alkylated in a Step 5 to obtain the compound of formula IV.

The reaction of Step 2 is suitably carried out analogously to the reaction of previously described Procedure A. The starting compounds VI are either known or may be prepared from known materials by procedures known in the art.

The reaction of Step 3 is suitably carried out at elevated temperatures and in the presence of an organic solvent, which is inert under the reaction conditions. The reaction temperature may, for example, range from about 100°C. to 220°C. and preferably 130°C. to 180°C. The preferred solvents are solvents boiling within the preferred range of reaction temperatures in order that reflux conditions may be employed, e.g. dimethylacetamide and dimethylformamide, more preferably dimethylacetamide. The mole ratio of cuprous cyanide to compound of formula VII in the reaction mixture is not particularly critical and typically ranges from approximately the stoichiometric amount required to form the desired product up to a moderate excess. The reaction time is typically about 1 to 10 hours. The "Hal" in the compound of formula VII is preferably a chlorine atom. The decomposition of the resulting cuprous complex may, for example, be effected by addition of methylene chloride, and the resulting product isolated for use by known procedures.

The reduction reaction of Step 4 may be effected according to any of several well-known procedures. Preferably, the reduction is carried out in an aqueous acidic medium employing a reducing metal of which illustrative examples include iron, zinc and tin, preferably iron. Suitable acids include hydrochloric acid and acetic acid, preferably hydrochloric acid. The reduction is preferably effected at a temperature of from 50°C. to 100°C. and in a solvent which is inert under the reaction conditions. Suitable solvents include water and lower alkanols, especially ethanol, and combinations thereof. An alternate known method of reduction involves catalytic hydrogenation in a known manner, employing Raney nickel, palladium or platinum as catalyst, and a convenient organic solvent, for example, methanol, ethanol or dioxane.

The alkylation reaction of Step 5 employed in producing compounds of formula IV may be carried out by known procedures involving tosylation, alkylation and detosylation of compounds IX. The compounds IV in which R' is branch chain alkyl and the branching occurs on the carbon atom attached directly to the nitrogen atom, e.g. an 2-isopropylaminobenzonitrile, are, however, preferably prepared by reaction of a compound of formula IX with an alkyl halide of formula X:

$$X'—R'_1 \qquad X$$

in which X' is bromo or iodo and $R'_1$ is a branched alkyl of the type above-indicated. The reaction of a compound IX with a compound X is exemplified hereinafter and may be generally carried out analogously to the similar procedures described in the above-mentioned application Ser. No. 775,201.

It will also be evident that the particularly preferred procedure for preparation of a compound of formula (I) will vary depending on one or more of several known factors including the particular compound desired, availability of starting materials and apparatus, cost and the like. In the usual case, the abovedescribed Procedure A is usually preferred for preparation of compounds (I) in which the morpholino substituent is to be placed at the 6-position of the quinazolinone product, e.g., for example, this route of synthesis was used to obtain 1-isopropyl-6-morpholino-4-phenyl-2(1H)-quinazolinone in Example 2 of this application. Procedure B is usually more suitable for preparation of compounds (I) in which the morpholino substituent is placed at other than the 6-position, e.g., this route of synthesis was used to obtain 1-isopropyl-7-morpholino-4-phenyl-2(1H)-quinazolinone in Example 1 of this application. Procedure B is used for R' = tert.alkyl.

Also within the scope of the novel compounds provided by the invention are pharmaceutically acceptable salts not materially affecting the pharmacological effect of the compounds of formula (I). Such salts include the acid addition salts, e.g., the hydrochloride, which is mentioned for purposes of illustration only. The acid addition salts may be produced as desired from the coresponding free bases by conventional procedures. Conversely, the free bases may be obtained from the salts by procedures known in the art.

The compounds of structural formula I are useful because they possess pharmacological activity in animals. In particular, the compounds are useful as anti-inflammatory agents as indicated by the Carrageenan-induced edema test on rats (oral administration). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about 0.3 milligrams to about 150 milligrams per kilogram of body weight, preferably given in divided doses 2 to 4 times a day, or in sustained release form. For most mammals the administration of from about 20 milligrams to about 1000 milligrams of the compound per day provides satisfactory results and dosage forms suitable for internal administration comprise from about 5 milligrams to about 500 milligrams of the compound in admixture with a solid or liquid pharmaceutical carrier or diluent.

The compounds I of the invention are also useful as analgesics as indicated by application of pressure to yeast-inflamed foot of the rat (oral administration). For such use, the compound may be administered to obtain satisfactory results at dosages and in modes similar to those employed in the treatment of inflammation.

A representative formulation is a tablet prepared by conventional tabletting techniques and containing the following ingredients:

| Ingredient | Parts by Weight |
|---|---|
| 6-morpholino-1-isopropyl-4-phenyl-2(1H)-quinazolinone | 50 |
| Tragacanth | 2 |
| Lactose | 39.5 |
| Corn Starch | 5 |
| Talcum | 3 |
| Magnesium Stearate | 0.5 |

As is often the case with compounds exhibiting anti-inflammatory and analgesic activity, compounds I within the scope of the invention also exhibit anti-bradykinin activity as demonstrated on intravenous administration to the guinea pig, for example, in doses of 4.0 to 5000 micrograms per kilogram of body weight.

The following examples show representative compounds encompassed within the scope of this invention and the manner in which such compounds are prepared. However, it is to be understood that the examples are for purposes of illustration only.

EXAMPLE 1

1-Isopropyl-7-morpholino-4-phenyl-2(1H)-Quinazolinone

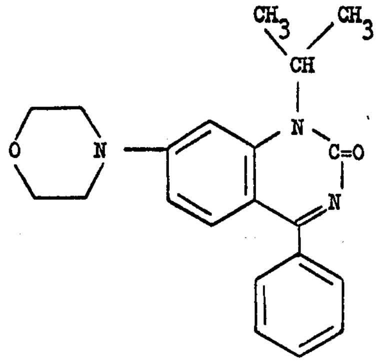

STEP A: Preparation of 4-morpholino-2-nitro-chlorobenzene.

A mixture of 50 g. of 4-chloro-3-nitroaniline and 50 g. of anhydrous potassium carbonate in 200 ml. of bis(2-bromoethyl)ether is stirred and heated at 160°C. for 6 hours. The resulting dark mixture is cooled to room temperature and diluted with 500 ml of methylene chloride. The inorganic solid is removed by filtration and the filtrate is concentrated to dryness to yield a crude residue which is crystallized from ethanol to obtain 4-morpholino-2-nitro-chlorobenzene, m.p. 104°C. to 105°C.

STEP B: Preparation of 2-cyano-5-morpholino-nitrobenzene.

A mixture of 43 g. of 4-morpholino-2-nitrochlorobenzene and 20 g. of cuprous cyanide in 150 ml. of dimethylacetamide is stirred and heated under reflux for 8 hours. The resulting dark brown solution is cooled and concentrated in vacuo. The residue is distributed between methylene chloride and water made basic with ammonium hydroxide. The organic phase is separated and first washed with about 2N ammonium hydroxide and then with water. After drying the methylene chloride is removed in vacuo to yield a residue which is crystallized from ethyl acetate to obtain 2-cyano-5-morpholino-nitrobenzene, m.p. 192°C. to 194°C.

STEP C: Preparation of 2-cyano-5-morpholino-aniline.

To a refluxing mixture of 10 g. of 2-cyano-5-morpholino-nitrobenzene in 100 ml. of ethanol, 20 ml. of dioxane and 30 ml. of concentrated hydrochloric acid is added 5 g. of iron powder in portions. When the addition is complete the mixture is refluxed for 30 minutes. It is then filtered hot through "Celite" and the filtrate is concentrated to dryness in vacuo. The residue is distributed between methylene chloride and 2N sodium hydroxide solution. The organic phase is separated and washed twice with a saturated solution of sodium chloride. After drying, the methylene chloride is removed in vacuo and the residue is crystallized from ethanol to obtain 2-cyano-5-morpholino-aniline, m.p. 141°C. to 142°C.

STEP D: Preparation of 2-cyano-5-morpholino-N-isopropylaniline.

A mixture of 5.4 g. of 2-cyano-5-morpholinoaniline and 5 g. of anhydrous sodium carbonate in 20 ml. of isopropyl iodide is heated under reflux for 96 hours. The mixture is then cooled, diluted with 100 ml. of ether and filtered. The filtrate is washed with water and dried. Removal of the ether gives a residue which is crystallized from ethanol to obtain 2-cyano-5-morpholino-N-isopropylaniline, m.p. 121°C. to 123°C.

STEP E: Preparation of 2-isopropylamino-4-morpholino-benzophenonimine.

A solution of 4.9 g. of 2-cyano-5-morpholino-N-isopropylaniline in 100 ml. of absolute ether is added dropwise to a stirred solution of 60 millimoles of phenyllithium in a 50/50 mixture of diethyl ether and benzene 0°–5°C. Stirring is continued for 1 hour while the mixture is allowed to warm to room temperature. It is then poured onto ice/water and the organic phase is separated. After drying over anhydrous sodium sulfate the solvent is removed in vacuo to obtain 2-isopropylamino-4-morpholino benzophenonimine as a crude oil.

STEP F: Preparation of 1-isopropyl-7-morpholino-4-phenyl-2(1H) quinazolinone.

To a mixture of 4 g. of crude 2-isopropylamino-4-morpholino-benzophenonimine and 5 ml. of triethylamine in 30 ml. of benzene, cooled to a temperature of 10°C. is added 25 ml. of 12% solution of phosgene in benzene. The resulting mixture is allowed to stand at room temperature for 1½ hours and then gently warmed in vacuo to remove excess phosgene. The residue is washed with 2N sodium hdyroxide solution and the organic phase is separated, dried and evaporated in vacuo to obtain an oil that is crystallized from a mixture of diethyl ether/methylene chloride in a ratio of about 3/1 to obtain 1-isopropyl-7-morpholino-4-phenyl-2(1H)-quinazolinone, m.p. 175°C. to 176°C.

This product may be readily converted to the hydrochloride acid addition salt which is crystallized from ethanol/diethyl ether to obtain 1-isopropyl-7-morpholino-4-phenyl-2(1H)-quinazolinone hydrochloride, m.p. 188°C to 192°C. (decomp.).

EXAMPLE 2

1-isopropyl-6-morpholino-4-phenyl-2(1H)-quinazolinone.

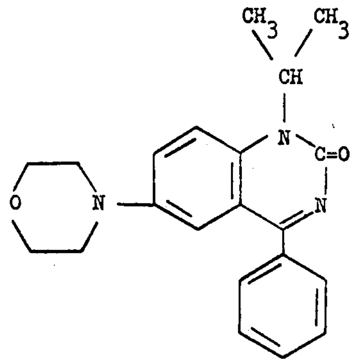

STEP A. Preparation of 5-nitro-2-isopropylaminobenzophenone.

A mixture of 15 g. of 5-nitro-2-chlorobenzophenone, 700 mg. of powdered copper, 700 mg. of cuprous chloride, 15 ml. of ethanol, and 15 ml. of liquid isopropylamine is refluxed for 20 hours. The reaction mixture is then worked up in a conventional manner to obtain a residue which is crystallized from ethanol to give yellow prisms of 5-nitro-2-isopropylaminobenzophenone, m.p. 155°C.

STEP B: Preparation of 6-nitro-1-isopropyl-4-phenyl-2(1H)-quinazolinone.

Employing substantially the procedure of Example 3 (Step B), hereinafter, and employing equivalent amounts, the residue of the organic phase is crystallized from ethyl acetate to give yellow prisms of 6-nitro-1-isopropyl-4-phenyl-2(1H)-quinazolinone, m.p. 190°–192°C.

STEP C: Preparation of 6-amino-1-isopropyl-4-phenyl-2(1H)-quinazolinone.

A solution of 12.0 g. of 6-nitro-1-isopropyl-4-phenyl-2(1H)-quinazolinone dissolved in 240 ml. of hot ethanol is heated to boiling and with stirring there is added 80 ml. of water, and then 16 g. of iron filings. There is then also added dropwise with stirring a solution made up of 80 ml. ethanol, 20 ml. water and 4 ml. 2N hydrochloric acid over the course of 40 minutes. The resulting mixture is refluxed for 3 hours, and there is then added to the hot solution 4 ml. of 2N sodium hydroxide followed by filtering and concentration in vacuo to remove most of the ethanol. There is added to the concentrate 100 ml. of ethyl acetate followed by extraction of the organic phase 3 times each with 50 ml. of dilute hydrochloric acid. The aqueous phases are combined and made alkaline with sodium hydroxide followed by 2 extractions each with 100 ml. of methylene chloride. The organic phases are combined and dried over anhydrous sodium sulfate, filtered and evaporated in vacuo to dryness. The residue is crystallized from ethyl acetate to obtain yellow prisms of 6-amino-1-isopropyl-4-phenyl-2(1H)-quinazolinone, m.p. 210° – 215°C.

STEP D: Preparation of 1-isopropyl-6-morpholino-4-phenyl-2(1H)-quinazolinone.

A mixture of 4 g. of 1-isopropyl-6-amino-4-phenyl-2(1H)-quinazolinone and 4 g. of anhydrous potassium carbonate in 20 ml. of bis(2-bromoethyl)ether is heated and stirred at 140°C. for 1½ hours. The excess reagent is then removed in vacuo and the residue is distributed between methylene chloride and ice cold 2N sodium hydroxide solution. The organic phase is separated, washed with water and dried. Removal of the solvent gives a crude oily product which is dissolved in ethanol and gaseous hydrogen chloride is passed through to precipitate the hydrochloride salt. This salt is isolated by filtration and shaken with methylene chloride/2N sodium hydroxide solution to re-isolate the free base. The organic phase is separated, dried and evaporated to give a residue which on crystallization from diethyl ether yields 1-isopropyl-6-morpholino-4-phenyl-2(1H)-quinazolinone, m.p. 172°–175°C.

EXAMPLE 3

1-isopropyl-7-methyl-6-morpholino-4-phenyl-2(1H)-quinazolinone.

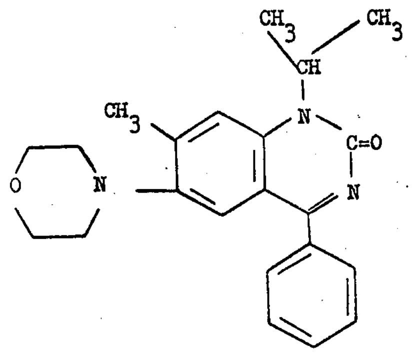

STEP A: Preparation of 4-methyl-2-isopropylaminobenzophenone.

A mixture of 7 g. of 4-methyl-2-aminobenzophenone, 6.35 g. of sodium carbonate and 18.8 ml. of 2-iodopropane is stirred and refluxed for 3 days. The cooled reaction mixture is then diluted with 200 ml. of benzene and washed twice with water and twice with brine. The organic phase is separated, dried over anhydrous sodium sulfate and concentrated in vacuo to remove substantially all of the benzene. The resulting yellow oil is dissolved in about 10 ml. of methylene chloride and subjected to column chromatography employing alumina (about 400 g.) and methylene chloride as eluant to give a first fraction which on concentration in vacuo to remove methylene chloride produced a yellow oil of 4-methyl-2-isopropylaminobenzophenone.

STEP B: Preparation of 1-isopropyl-7-methyl-4-phenyl-2(1H)-quinazolinone.

A mixture of 5.9 g. of 4-methyl-2-isopropylaminobenzophenone prepared in Step A above, 13.9 g. of urethane and 500 milligrams of zinc chloride is heated at a temperature of 190°C. for 1½ hours. There is then additionally added 7 g. of urethane and 250 milligrams of zinc chloride, and the heating continued at a temperature of 190°C. for an additional 2½ hours. The resulting mixture is cooled to about 100°C. and diluted with chloroform. The resulting mixture is then filtered and the filtrate washed with water and then with brine. The organic phase is separated, dried over anhydrous sodium sulfate and concentrated in vacuo to remove substantially all of the chloroform and obtain an oily residue which is dissolved in a small amount of about 20 ml. of methylene chloride. The resulting solution is then diluted with about 40 ml. of ethyl acetate and concentrated in vacuo to crystallize 1-isopropyl-7-methyl-4-phenyl-2(1H)-quinazolinone; m.p. 137° to 138°C.

STEP C. Preparation of 1-isopropyl-7-methyl-6-nitro-4-phenyl-2(1H)-quinazolinone.

To a cooled solution (0.5°C.) of 13.9 g. of 1-isopropyl-7-methyl-4-phenyl-2(1H)-quinazolinone in 50 ml. of concentrated sulfuric acid is added dropwise over 10 minutes a solution of 6.07 g. of potassium nitrate in 15 ml. of concentrated sulfuric acid. The resulting solution is allowed to warm to room temperature and then stirred for 2 hours. The solution is then poured into ice water and the resulting solid is isolated by filtration. The solid is dissolved in 100 ml. of diethyl ether and the solution is washed once with 100 ml. of water before being drived over anhydrous sodium sulfate. The mixture is filtered and the filtrate is evaporated in vacuo to yield a residue which is crystallized from 50 ml. of ethyl acetate to obtain 1-isopropyl-7-methyl-6-nitro-4-phenyl-2(1H)-quinazolinone, m.p. 192°–194°C.

STEP D: Preparation of 6-amino-1-isopropyl-7-methyl-2-phenyl-2(1H)-quinazolinone.

A mixture of 7.5 g. of 1-isopropyl-7-methyl-6-nitro-4-phenyl-2(1H)-quinazolinone and about 9 g. of Raney Nickel sludge in water in 150 ml. of dioxane is shaken at room temperature under a hydrogen pressure of 50 psi. for 5 hours. The reaction mixture is then filtered through Celite, the filtrate is evaporated to dryness, and the residue crystallized from ethyl acetate to obtain 6-amino-1isopropyl-7-methyl-4-phenyl-2(1H)-quinazolinone, m.p. 193°–196°C.

STEP E: Preparation of 1-isopropyl-7-methyl-6-morpholino-4-phenyl-2(1H)-quinazolinone.

A mixture of 7.5 g. of 6-amino-1-isopropyl-7-methyl-4-phenyl-2(1H)-quinazolinone and 1.5 g. of anhydrous potassium carbonate in 8 ml. of bis(2-bromoethyl)ether is heated and stirred at 120°C. for 24 hours. The mixture is worked us as described in Example 2(Step D) to obtain on crystallization from ethyl acetate/diethyl ether (10:1) the compound 1-isopropyl-7-methyl-6-morpholino-4-phenyl-2(1H)-quinazolinone, m.p. 218°–221°C.

The word "lower" as used herein in association with such terms as "lower alkyl", "lower alkoxy", and the like shall be taken as indicating an organic substituent of from 1 to 6 carbon atoms, inclusive, unless otherwise defined herein.

What is claimed is:

1. A compound of the formula:

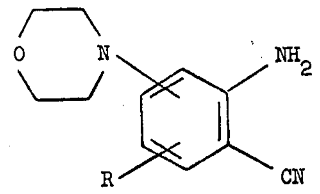

wherein

R represents hydrogen; halo of atomic weight no greater than 80; lower alkyl; or lower alkoxy 2. The compound of claim 1 which is 2-cyano-5-morpholino-aniline.

* * * * *